US011703320B2

(12) United States Patent
Froment et al.

(10) Patent No.: US 11,703,320 B2
(45) Date of Patent: Jul. 18, 2023

(54) DETERMINING RELATIVE POSITIONS OF USER DEVICES

(71) Applicant: Amazon Technologies, Inc., Seattle, WA (US)

(72) Inventors: Arnaud Marie Froment, San Jose, CA (US); Kenneth Paul Kiraly, Menlo Park, CA (US); Levon Dolbakian, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 554 days.

(21) Appl. No.: 16/875,319

(22) Filed: May 15, 2020

(65) Prior Publication Data

US 2020/0348124 A1 Nov. 5, 2020

Related U.S. Application Data

(63) Continuation of application No. 14/750,266, filed on Jun. 25, 2015, now Pat. No. 10,655,951.

(51) Int. Cl.
| | |
|---|---|
| *G01B 11/14* | (2006.01) |
| *G06T 11/20* | (2006.01) |
| *G06T 7/70* | (2017.01) |
| *G06V 20/20* | (2022.01) |

(52) U.S. Cl.
CPC ............. *G01B 11/14* (2013.01); *G06T 7/70* (2017.01); *G06T 11/20* (2013.01); *G06V 20/20* (2022.01)

(58) Field of Classification Search
CPC .......... G01B 11/14; G06T 7/70; G06T 11/20; G06V 10/42

USPC ........................................................ 348/135
See application file for complete search history.

(56) References Cited

U.S. PATENT DOCUMENTS

| | | | |
|---|---|---|---|
| 5,086,385 | A | 2/1992 | Launey et al. |
| 5,307,295 | A | 4/1994 | Taylor et al. |
| 6,052,750 | A | 4/2000 | Lea |
| 6,653,933 | B2 | 11/2003 | Raschke et al. |
| 6,654,720 | B1 | 11/2003 | Graham et al. |

(Continued)

FOREIGN PATENT DOCUMENTS

KR     100998897 B1    12/2010

OTHER PUBLICATIONS

Office Action for U.S. Appl. No. 16/657,938, dated Nov. 3, 2021, Mutagi, "Remote Execution of Secondary-Device Drivers", 29 pages.

(Continued)

*Primary Examiner* — Sath V Perungavoor
*Assistant Examiner* — Kristin Dobbs
(74) *Attorney, Agent, or Firm* — Lee & Hayes, P.C.

(57) ABSTRACT

Techniques for determining positions of devices within an environment are described herein. In some instances, an environment, such as a home or office of a user, may include an array of devices, some or all of which may couple to a network or to other devices via short-range wireless connections (e.g., Bluetooth®, Zigbee®, etc.). These devices may capture an array of data for providing to a central service, which is configured to analyze the data and, based on this analysis, determine a location of the devices relative to one another. That is, the central service may analyze the data to determine relative distances and orientations between the identified devices within the environment.

18 Claims, 7 Drawing Sheets

(56) References Cited

U.S. PATENT DOCUMENTS

| | | |
|---|---|---|
| 6,725,281 B1 | 4/2004 | Zintel et al. |
| 6,812,881 B1 | 11/2004 | Mullaly et al. |
| 6,845,451 B1 | 1/2005 | Anand et al. |
| 6,930,788 B1 | 8/2005 | Iwamoto et al. |
| 7,139,716 B1 | 11/2006 | Gaziz |
| 7,418,392 B1 | 8/2008 | Mozer et al. |
| 8,078,290 B2 | 12/2011 | Nelson |
| 8,116,754 B2 | 2/2012 | Kim et al. |
| 8,176,503 B2 | 5/2012 | Ford et al. |
| 8,340,975 B1 | 12/2012 | Rosenberger |
| 8,490,006 B1 | 7/2013 | Reeser et al. |
| 8,516,087 B2 | 8/2013 | Wilson et al. |
| 8,850,346 B2 | 9/2014 | Keenan, Jr. et al. |
| 9,071,603 B1 | 6/2015 | Frederick et al. |
| 9,087,514 B2 | 7/2015 | Jonsson |
| 9,241,257 B1 | 1/2016 | Kim et al. |
| 9,443,527 B1 | 9/2016 | Watanabe et al. |
| 9,554,061 B1 | 1/2017 | Proctor, Jr. et al. |
| 9,680,646 B2 | 6/2017 | Nadathur et al. |
| 9,875,647 B1 | 1/2018 | Tannenbaum et al. |
| 10,453,461 B1 | 10/2019 | Mutagi et al. |
| 2001/0041982 A1 | 11/2001 | Kawasaki et al. |
| 2002/0129353 A1 | 9/2002 | Williams et al. |
| 2003/0012168 A1 | 1/2003 | Elson et al. |
| 2003/0018805 A1 | 1/2003 | Meyerson |
| 2003/0040812 A1 | 2/2003 | Gonzales et al. |
| 2003/0103088 A1 | 6/2003 | Dresti et al. |
| 2004/0070491 A1 | 4/2004 | Huang et al. |
| 2004/0267385 A1 | 12/2004 | Lingemann |
| 2005/0071879 A1 | 3/2005 | Haldavnekar et al. |
| 2005/0096753 A1 | 5/2005 | Arling et al. |
| 2005/0108369 A1 | 5/2005 | Sather et al. |
| 2005/0131551 A1 | 6/2005 | Ruutu et al. |
| 2006/0077174 A1 | 4/2006 | Chung et al. |
| 2006/0080408 A1 | 4/2006 | Istvan et al. |
| 2006/0123053 A1 | 6/2006 | Scannell, Jr. |
| 2006/0248557 A1 | 11/2006 | Stark et al. |
| 2007/0260713 A1 | 11/2007 | Moorer et al. |
| 2007/0287542 A1 | 12/2007 | Miyazaki et al. |
| 2008/0037485 A1 | 2/2008 | Osinga et al. |
| 2008/0064395 A1 | 3/2008 | Sibileau |
| 2008/0167931 A1 | 7/2008 | Gerstemeier et al. |
| 2008/0313299 A1 | 12/2008 | Ebbe et al. |
| 2009/0046715 A1 | 2/2009 | McCoy |
| 2009/0076827 A1 | 3/2009 | Bulitta et al. |
| 2009/0204410 A1 | 8/2009 | Mozer et al. |
| 2009/0316671 A1 | 12/2009 | Rolf et al. |
| 2010/0104255 A1 | 4/2010 | Yun et al. |
| 2010/0185445 A1 | 7/2010 | Comerford et al. |
| 2010/0289643 A1 | 11/2010 | Trundle et al. |
| 2011/0044438 A1 | 2/2011 | Wang et al. |
| 2011/0087726 A1 | 4/2011 | Shim et al. |
| 2011/0190913 A1 | 8/2011 | Van De Sluis et al. |
| 2011/0193579 A1 | 8/2011 | Wong et al. |
| 2011/0205965 A1 | 8/2011 | Sprigg et al. |
| 2011/0211584 A1 | 9/2011 | Mahmoud |
| 2012/0253824 A1 | 10/2012 | Alcantara Talavera |
| 2013/0010207 A1 | 1/2013 | Valik et al. |
| 2013/0038800 A1 | 2/2013 | Yoo |
| 2013/0052946 A1 | 2/2013 | Chatterjee et al. |
| 2013/0086245 A1 | 4/2013 | Lu et al. |
| 2013/0156198 A1* | 6/2013 | Kim .................. H04R 1/323 381/17 |
| 2013/0162160 A1 | 6/2013 | Ganton et al. |
| 2013/0183944 A1 | 7/2013 | Mozer et al. |
| 2013/0188097 A1 | 7/2013 | Smith |
| 2013/0218572 A1 | 8/2013 | Cho et al. |
| 2014/0005809 A1 | 1/2014 | Frei et al. |
| 2014/0032651 A1 | 1/2014 | Singh et al. |
| 2014/0062297 A1* | 3/2014 | Bora .................. H05B 45/10 315/297 |
| 2014/0074653 A1 | 3/2014 | Wang et al. |
| 2014/0082151 A1 | 3/2014 | Chen et al. |
| 2014/0098247 A1 | 4/2014 | Rao et al. |
| 2014/0163751 A1 | 6/2014 | Davis et al. |
| 2014/0167929 A1 | 6/2014 | Shim et al. |
| 2014/0176309 A1 | 6/2014 | Wang et al. |
| 2014/0188463 A1 | 7/2014 | Noh et al. |
| 2014/0191855 A1 | 7/2014 | Kim et al. |
| 2014/0244267 A1 | 8/2014 | Levi |
| 2014/0249825 A1 | 9/2014 | Proud |
| 2014/0309789 A1 | 10/2014 | Ricci |
| 2014/0343946 A1 | 11/2014 | Torok et al. |
| 2014/0349269 A1 | 11/2014 | Canoy et al. |
| 2014/0358553 A1 | 12/2014 | Helmke et al. |
| 2014/0376747 A1 | 12/2014 | Mullet et al. |
| 2015/0005900 A1 | 1/2015 | Steele et al. |
| 2015/0006742 A1 | 1/2015 | Beals et al. |
| 2015/0019714 A1 | 1/2015 | Shaashua et al. |
| 2015/0020191 A1 | 1/2015 | Vida et al. |
| 2015/0053779 A1 | 2/2015 | Adamek et al. |
| 2015/0058955 A1 | 2/2015 | Ganapathy et al. |
| 2015/0066516 A1 | 3/2015 | Nishikawa et al. |
| 2015/0236899 A1 | 3/2015 | Sengupta et al. |
| 2015/0097663 A1 | 4/2015 | Sloo et al. |
| 2015/0140990 A1 | 5/2015 | Kim et al. |
| 2015/0142704 A1 | 5/2015 | London |
| 2015/0154976 A1 | 6/2015 | Mutagi |
| 2015/0161370 A1 | 6/2015 | North et al. |
| 2015/0162006 A1 | 6/2015 | Kummer |
| 2015/0163412 A1 | 6/2015 | Holley et al. |
| 2015/0168538 A1 | 6/2015 | Bradley et al. |
| 2015/0170665 A1 | 6/2015 | Gundeti et al. |
| 2015/0195099 A1 | 7/2015 | Imes et al. |
| 2015/0204561 A1 | 7/2015 | Sadwick et al. |
| 2015/0222517 A1 | 8/2015 | McLaughlin et al. |
| 2015/0242381 A1 | 8/2015 | Oh et al. |
| 2015/0263886 A1 | 9/2015 | Wang et al. |
| 2015/0264322 A1 | 9/2015 | Ang |
| 2015/0294086 A1 | 10/2015 | Kare et al. |
| 2015/0312113 A1 | 10/2015 | Forutanpour et al. |
| 2015/0324706 A1 | 11/2015 | Warren |
| 2015/0334554 A1 | 11/2015 | Song et al. |
| 2015/0347114 A1 | 12/2015 | Toon |
| 2015/0347683 A1 | 12/2015 | Ansari et al. |
| 2015/0348551 A1 | 12/2015 | Gruber et al. |
| 2015/0350031 A1 | 12/2015 | Burks et al. |
| 2015/0351145 A1 | 12/2015 | Burks et al. |
| 2015/0365217 A1 | 12/2015 | Scholten et al. |
| 2015/0366035 A1 | 12/2015 | Baek et al. |
| 2015/0373149 A1 | 12/2015 | Lyons |
| 2016/0042748 A1 | 2/2016 | Jain et al. |
| 2016/0043962 A1 | 2/2016 | Kim et al. |
| 2016/0044032 A1 | 2/2016 | Kim et al. |
| 2016/0098284 A1 | 4/2016 | Herberg et al. |
| 2016/0098997 A1 | 4/2016 | Ding |
| 2016/0099815 A1 | 4/2016 | Park et al. |
| 2016/0134737 A1 | 5/2016 | Pulletikurty |
| 2016/0139575 A1 | 5/2016 | Funes |
| 2016/0195856 A1 | 7/2016 | Spero |
| 2016/0259308 A1 | 9/2016 | Fadell et al. |
| 2016/0269524 A1 | 9/2016 | Stottlemyer |
| 2016/0344815 A1 | 11/2016 | Hyun et al. |
| 2016/0358443 A1 | 12/2016 | True |
| 2016/0359629 A1 | 12/2016 | Nadathur et al. |
| 2016/0366481 A1 | 12/2016 | Lim et al. |
| 2017/0004828 A1 | 1/2017 | Lee et al. |
| 2017/0055126 A1 | 2/2017 | O'Keeffe |
| 2020/0159491 A1 | 5/2020 | Mutagi et al. |
| 2021/0326103 A1 | 10/2021 | Mutagi et al. |

OTHER PUBLICATIONS

Office Action for U.S. Appl. No. 16/523,481, dated Aug. 18, 2021, Raeber, "Interoperability of Secondary-Device Hubs", 12 pages.

Office Action for U.S. Appl. No. 16/424,285, dated Aug. 20, 2021, Mutagi, "Creating Scenes From Voice-Controllable Devices", 32 pages.

Office Action for U.S. Appl. No. 16/424,285, dated Dec. 27, 2021, Mutagi, "Creating Scenes From Voice-Controllable Devices", 32 pages.

Office Action for U.S. Appl. No. 16/523,481, dated Apr. 13, 2021, Raeber, "Interoperability of Secondary-Device Hubs", 12 pages.

(56) References Cited

OTHER PUBLICATIONS

Office Action for U.S. Appl. No. 16/523,481, dated Nov. 13, 2020, Raeber, "Interoperability of Secondary-Device Hubs", 11 Pages.
Bendersky, "Finite State Machines and Regular Expressions", Retreived from «http://www.gamedev.net/page/resources/_/technical/general-programming/finite-state-machines-and-regular-expressionsr3176», GameDev.net, Jun. 2013, 31 pages.
Krishna et al., "Zigbee Based Voice Control System for Smart Home", IJCTA, Jan.-Feb. 2012, vol. 3, pp. 163-pp. 168.
Non Final Office Action dated Jan. 11, 2019 for U.S. Appl. No. 14/750,266 "Determining Relative Positions of User Devices" Fremont, 34 pages.
Office Action for U.S. Appl. No. 16/042,389, dated Feb. 14, 2020, Mutagi, "Grouping Devices for Voice Control", 28 Pages.
Office Action for U.S. Appl. No. 16/042,389, dated Jul. 6, 2020, Mutagi, "Grouping Devices for Voice Control", 28 Pages.
Office Action for U.S. Appl. No. 14/752,321, dated Jan. 25, 2019, Mutagi et al., "Creating Scenes from Voice-Controllable Devices", 51 pages.
Office action for U.S. Appl. No. 14/752,321, dated Oct. 4, 2016, Mutagi etal, "Creating Scenes from Voice-Controllable Devices", 39 pages.
Office action for U.S. Appl. No. 14/752,257, dated Nov. 28, 2016, Mutagi et al., "Mapping Device Capabilities to a Predefined Set", 32 pages.
Office Action for U.S. Appl. No. 14/750,266, dated Nov. 30, 2017, Mutagi, "Remote Execution of Secondary-Device Drivers", 29 pages.
Office action for U.S. Appl. No. 14/752,198, dated Dec. 2, 2016, Mutagi et al., "Grouping Devices for Voice Control", 33 pages.
Final Office Action dated Dec. 14, 2018 for U.S. Appl. No. 14/752,134 "Remote Execution of Secondary-Device Drivers" Mutagi, 50 pages.
Office Action for U.S. Appl. No. 14/752,198, dated Dec. 26, 2017, Mutagi et al., "Grouping Devices for Voice Control", 20 pages.
Office action for U.S. Appl. No. 14/752,321, dated Dec. 26, 2017, Rohan Mutagi, "Creating Scenes from Voice-Controllable Devices", 47 pages.
Office action for U.S. Appl. No. 14/752,198, dated Mar. 10, 2016, Mutagi et al., "Grouping Devices for Voice Control", 17 pages.
Office action for U.S. Appl. No. 14/752,257, dated Mar. 14, 2016, Mutagi et al., "Mapping Device Capabilities to a Predefined Set", 19 pages.
Office action for U.S. Appl. No. 14/752,321, dated Mar. 23, 2016, Mutagi et al., "Creating Scenes from Voice-Controllable Devices", 21 pages.
Office action for U.S. Appl. No. 14/752,134, dated Mar. 24, 2016, Mutagi et al., "Remote Execution of Secondary-Device Drivers", 17 pages.
Office Action for U.S. Appl. No. 14/788,327, dated Apr. 10, 2018, Raeber et al., "Interoperability of Secondary-Device Hubs", 15 pages.
Office Action for U.S. Appl. No. 14/752,134, dated Apr. 19, 2018, Mutagi, "Remote Execution of Secondary-Device Drivers", 48 pages.
Office action for U.S. Appl. No. 14/752,321, dated May 25, 2017, Rohan Mutagi, "Creating Scenes from Voice-Controllable Devices", 45 pages.
Office action for U.S. Appl. No. 14/752,134, dated May 3, 2017, Mutagi et al., "Remote Execution of Secondary-Device Drivers", 28 pages.
Office Action for U.S. Appl. No. 14/750,266, dated Jun. 28, 2018, Froment, "Determining Relative Positions of User Devices", 32 pages.
Office action for U.S. Appl. No. 14/752,198, dated Jun. 30, 2017, Mutagi et al., "Grouping Devices for Voice Control", 43 pages.
Office Action for U.S. Appl. No. 14/752,257, dated Aug. 11, 2017, Rohan, "Mapping Device Capabilities to a Predefined Set", 51 pages.
Office Action for U.S. Appl. No. 16/042,389, dated Aug. 19, 2019, Mutagi, "Grouping Devices for Voice Control", 24 pages.
Office Action for U.S. Appl. No. 14/788,327, dated Sep. 12, 2018, Raeber et al., "Interoperability of Secondary-Device Hubs", 13 pages.
Office action for U.S. Appl. No. 14/752,134, dated Sep. 22, 2016, Mutagi et al., "Remote Execution of Secondary-Device Drivers", 24 pages.
Ranger, "What is Apple iBeacon? Here's what you need to know", ZDNet, retreived at «http://www.zdnet.com/article/what-is-apple-ibeacon-heres-what-you-need-to-know/», Jun. 10, 2014, 4 pages.
Office Action for U.S. Appl. No. 17/737,383, dated Feb. 16, 2023, Inventor #1 Eric Peter Raeber, "Interoperability of Secondary-Device Hubs", 11 pages.

* cited by examiner

US 11,703,320 B2

DETERMINING RELATIVE POSITIONS OF USER DEVICES

PRIORITY

This application is a continuation of, and claims priority to, U.S. patent application Ser. No. 14/750,266, filed on Jun. 25, 2015, entitled "Determining Relative Positions of User Devices", and is fully incorporated by reference herein.

BACKGROUND

Homes are becoming more wired and connected with the proliferation of computing devices such as desktops, tablets, entertainment systems, portable communication devices, and smart appliances. As these computing devices evolve, users continue to rely more and more on the capabilities of these devices. Understanding the locations of these devices in user environments may enhance user experiences with these devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
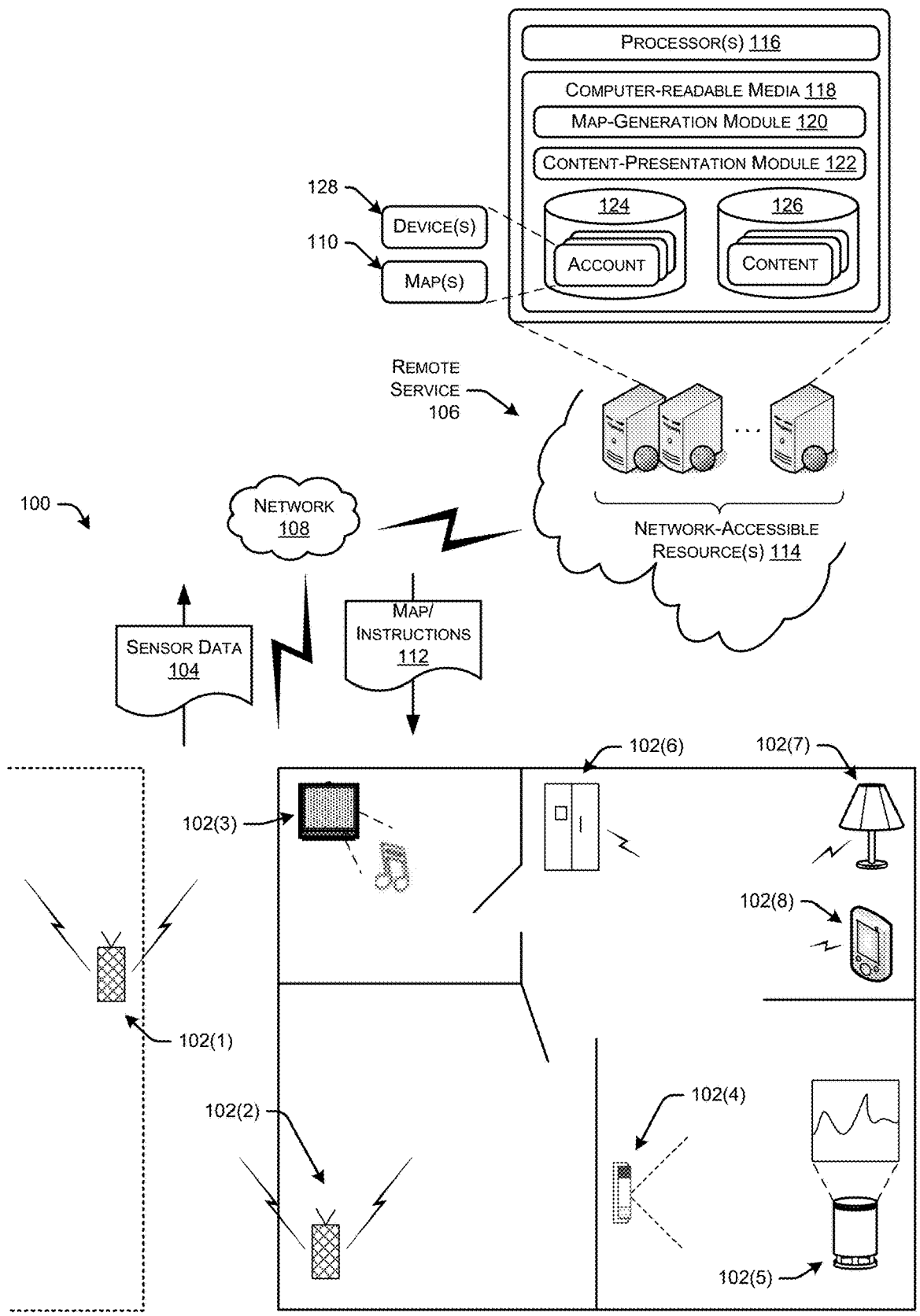
FIG. 1 is a schematic diagram of an illustrative environment that includes multiple devices within an environment, such as a home of a user. These devices may be configured to capture an array of data and provide this data to a remote service, which may analyze this data to determine a position of the devices within the environment relative to one another.

Techniques for determining positions of devices within an environment are described herein. In some instances, an environment, such as a home or office of a user, may include an array of devices, some or all of which may couple to a network or to other devices via short-range wireless connections (e.g., Bluetooth®, Zigbee®, etc.). These devices may include traditional computing devices (e.g., tablet computers, laptop computers, desktop computers, wireless access points (WAPs) mobile phones, etc.), "smart appliances" (e.g., smart televisions, smart light bulbs, smart refrigerators, etc.) and other types of devices (e.g., voice-controlled devices, imaging devices, etc.). Some of these devices may be stationary (i.e., may typically reside in a single place within an environment, while other devices may be mobile (i.e., may typically move throughout the environment).

As discussed below, these devices may capture an array of data for providing to a central service, which is configured to analyze the data and, based on this analysis, determine a location of the devices relative to one another. That is, the central service may analyze the data to determine relative distances and orientations between the identified devices within the environment.

The devices described above may capture an array of data. For instance, a WAP or other device may identify other devices that are within wireless range of the WAP and may determine a signal strength between the WAP and each device. The WAP may then provide this wireless-signal-strength data to the central location. Typically, devices located nearer the WAP having a higher wireless signal strength than devices located further from the WAP.

In another example, a device having a camera may capture one or more images of the environment, some of which may illustrate other devices within the environment. The device may upload these one or more images (e.g., still images, video, etc.) to the central service, which may utilize object-recognition techniques to identify the other devices from the one or more images. The central service may also estimate a distance to each device identified within a respective image(s) as well as an orientation of the identified device to the device having the camera. In still other instances, the central service may instruct devices in the environment to display certain content for later identification within the images captured by the camera. For instance, the central service may instruct a television to display a certain pattern, which may be later recognized in one or more images for both identifying the television device as well as estimating a distance and orientation between the television and the camera capturing the images.

In yet another example, a device having multiple microphones may capture audio output by another device within the environment and may calculate a time-difference-of-arrival (TDOA) between a time at which a first microphone of the capturing device received the audio and a time at which a second microphone of the capturing device received the audio. Again, the device may provide this TDOA data to the central service, which may analyze the TDOA data to determine the identity of the device outputting the audio, as well as estimate a distance and orientation between the identified device and the device that captured the audio. For instance, the central service may analyze the difference in the time-of-arrival of the audio between the first microphone and the second microphone to determine the orientation between the identified device and the device that captured the audio. If, for instance, the difference is relatively small, then the central service may determine that the first and the second microphones, and portions of the device to which these microphones couple, are oriented to the identified device in the same manner as each other. That is, it may be determined that the first microphone and the second microphone are a substantially equal distance to the identified device. If, however, the difference is quite large, then the central service may determine that the microphone that captured the audio first is oriented substantially closer to the identified device than the other microphone.

To identify the device that outputted the audio, the central service may first identify the audio captured by the capturing device and determine which of the multiple devices within the environment of the capturing device's environment is outputting the identified audio (if any). In addition to the above, the central service may perform beamforming techniques on the received audio to estimate a distance and orientation between the device that output he audio and the device that captured the audio.

In still other examples, devices within the environment may capture additional data such as a barometric pressure at a location of a respective device (e.g., via a barometer of the respective device), an amount of ambient light present at the respective device (e.g., via a light sensor of the device), or the like. Again, the devices may upload this data to a central service.

The central service may reside remote from the environment (e.g., "in the cloud") or within the environment (e.g., on one or more of the devices within the environment). Upon receiving some or all of the data listed above, the central service may analyze the data to generate a map indicating positions of the devices relative to one another.

In some instances, the central service may distribute the generated map to one or more devices within the environment, such that these devices may determine actions to take in response to certain triggers. In other instances, the central service makes decisions based at least in part on the positions of the devices within the environment.

For example, the central service may present content on different devices within the environment based on the generated map and based on indications of where a user within the environment is currently located. To illustrate, when a user carrying his mobile phone enters the environment, one or more devices within the environment may sense the presence of the mobile phone or the user (e.g., via a wireless-signal strength, via images that illustrate the phone or the user, etc.). The devices may provide this data to the central service that determines that the mobile device is present and that determines where the device is currently located. Thereafter, when a user requests to present certain content, the central service may determine a current location of the mobile phone (and, presumably, the user) and may output the content on the device located nearest the user (e.g., of the devices within the environment capable of outputting the requested content).

Furthermore, as the central service determines that the mobile device and/or the user moves throughout the environment, the central service may change which device within the environment presents the content. For instance, if the user requests to watch a certain TV show when the user enters the first level of his house, the central service may instruct the television on the first level of the house to turn on the requested TV show. As the central service determines that the mobile device and/or user is moving from the first level to a second level of the home, the central service may issue an instruction to cause a TV on the second level to begin presenting the content (potentially along with an instruction to cause the TV on the first level to cease output of the content).

In another example, the central service may use the generated position map as well as a current location of a user when determining an action to take in response to receiving a command (e.g., a voice command) from the user. For instance, envision that the user issues, to a voice-controlled device of the user, a voice command to "play The Cure". In response to identifying this voice command, the central service may attempt to take the appropriate action. In this example, the central service may determine that "The Cure" may correspond to a band of that name or to a movie of the same name. Therefore, the central service may compare a location of the user within the environment to the positions of the devices within the environment. In response to determining that the user is within a threshold distance of a TV, the central service may determine to play the movie "The Cure". In response to determine that the user is not near a TV but is instead only near a device capable of outputting audio, the central service may determine to play music from the band "The Cure".

FIG. 1 is a schematic diagram of an illustrative environment 100 that includes multiple devices 102(1), 102(2), . . . , 102(8), some or all of which may be associated with a user account of a user. That is, each of the devices 102 may be associated with an account of a respective user at a remote service 106. In this example, the environment 100 comprises a home of a user, although other environments may comprise offices, buildings, gyms, schools, city blocks, towns, or the like.

The example devices 102(1)-(8) may be configured to capture an array of data 104 and provide this data to the remote service 106 over a network 108. The remote service 106 may in turn analyze this data to determine a position of the devices within the environment 100 relative to one another. It is noted that FIG. 1 is provided to aid in comprehension of the disclosed techniques and systems. As such, it should be understood that the discussion that follows is non-limiting. The network 108, meanwhile, may represent an array or wired networks, wireless networks (e.g., WiFi), or combinations thereof.

As illustrated, the environment 100 includes an array of example devices, including a WAP 102(1) located in a neighboring home, a WAP 102(2), a television 102(3) configured output audio and video, an imaging device 102(4) configured to capture one or more images of the environment 100, a voice-controlled device 102(5) configured to generate audio signals based on audio captured within the environment, a refrigerator 102(6) configured to communicate with other devices, a lamp 102(7) configured to communicate with other devices, and a mobile device 102(8) of a user, such as a mobile phone. Some or all of the devices may include a wireless (and/or wired) interface for communicating with other devices within or outside of the environment. In some instances, a device may communicate over a local area network (LAN) or wide area network (WAN), while in other instances a device may communicate additionally or alternatively via a short-range wireless radio communication connection (e.g., Bluetooth®, Zigbee®, etc.). Further, while FIG. 1 illustrates several example devices that may reside within an environment, in other instances the environment 100 may include devices such as lights, dishwashers, washing machines, coffee machines, refrigerators, door locks, window blinds, thermostats, garage doors, televisions, audio systems, and the like.

Each of the devices 102(1)-(8) may be configured to capture data associated with a current state of the environment, with some or all of this data indicative of a presence of one or more other devices. The WAPs 102(1) and 102(2), for instance, may be configured to wirelessly sense one or more of the other devices within the environment, as well as a respective signal strength between each WAP and each identified device. Each WAP may then provide, to the remote service 106 and for each device within range of the WAP, an identifier of the device and a corresponding signal strength. As illustrated, the WAPs 102(1)-(2) may provide this sensor data 104 over the network. In some instances, each of the devices 102(1)-(8) may provide sensor data 104 directly to the remote service 106, while in other instances the devices may aggregate the data and only one or two devices may send the sensor data 104 to the service 106.

The TV 102(3), meanwhile, may include one or more sensors for identifying other devices within the environment. For instance, the TV 102(3) may comprise a "smart TV" having wireless functionality for identifying nearby devices. Like the WAPs discussed above, the TV 102(3) may send this sensor data to the remote service 106. Additionally or alternatively, the TV 102(3) may include a camera for capturing one or more images of the environment 100. In these instances, the TV 102(3) may provide these captured images to the remote service 106, which may in turn identify any devices within the images for estimating a distance to the respective devices and orientations of the respective devices.

In addition, FIG. 1 illustrates that the TV 102(3) may output audio, potentially as part of a television program, movie, or other video. The voice-controlled device 102(5), meanwhile, may comprise one or more microphones that capture the received audio and generate a corresponding audio signal, as FIG. 1 illustrates. In some instances, the voice-controlled device 102(5) may include at least two microphones such that each microphone receives the audio from the TV 102(3) (or other device(s)) at different times. The device 102(5) may store an indication of difference in time between when the first microphone and the second microphone received the audio, which may be used to determine TDOA value. The device 102(5) may provide this TDOA value, potentially along with the generated audio signal, to the remote service 106. The remote service 106 may in turn identify the audio and identify which device within the environment is outputting that particular audio. That is, the remote service 106 may determine that the audio corresponds to a particular movie that a user associated with the TV 102(3) has requested to play on the TV 102(3). As such, the remote service 106 may utilize the TDOA value(s) to estimate a distance and an orientation between the voice-controlled device 102(5) and the TV 102(3).

The imaging device 102(4), meanwhile, may be configured to capture one or more images of the environment 100, in the form of still image(s) and/or video(s). In this example, the imaging device 102(4) may capture one or more images that include the voice-controlled device 102(5) and may send these images as sensor data 104 to the remote service 106. The remote service, in turn, may analyze the image(s) to identify the presence of the device 102(5). After identifying the device 102(5), the remote service 106 may estimate a distance and orientation between the device 102(4) and the device 102(5).

In this example, the refrigerator 102(6) may comprise a smart appliance configured to wirelessly communicate with one or more other devices. Similarly, the lamp 102(7) may comprise a "smart light bulb" that is controllable via wireless communications (e.g., voice commands, graphical user interfaces, etc.) and that is configured to wirelessly communicate with one or more other devices. In these instances, one or more devices within the environment, such as the WAP 102(2) and/or the mobile device 102(8) may sense the presence of both the refrigerator 102(6) and the lamp 102(7), along with a signal strength associated with both. The WAP 102(2) and/or the mobile device 102(8) may send an identification of these devices along with corresponding signal strengths to the remote service 106, which may use this data to approximate the position of these devices within the environment 100.

Finally, in some instances the mobile device 102(8) may not only sense other devices within the environment, but may also be sensed by other devices, such as the WAP 102(2). In these instances, and as discussed below, the remote service 106 may determine one or more operations to perform based on the location of the mobile device relative to the other devices 102(7). For instance, and as discussed above, when a user issues a command to present certain content, the remote service 106 may determine a location of the mobile device 102(8) associated with the user in determine which device on which to output the content. In another example, the remote service 106 may actually interpret commands with reference to a location of the mobile device 102(8), as discussed above with reference to the example of "The Cure".

In response to receiving the sensor data 104, the remote service may analyze the data to create a position map 110 indicating relative positions of the devices 102(1)-(8) within the environment 100. After generating this map 110, the remote service 106 may send the map and/or instructions 112 to one or more of the devices 102(1)-(8) via the network 108. For example, the remote service 106 may send the map to one of the devices such that one or more devices within the environment 100 are able to generally understand the layout of other devices within the environment. Further, and as discussed above, the remote service may send instructions to different devices based in part on the map 110. For instance, the remote service 106 may send an instruction to a particular device to display content requested by a user based on that particular device being near the user at the time of the request.

As illustrated, the remote service 106 may comprise one or more network-accessible resources 114 in the form server computing devices. The remote service 106 may generally refer to a network-accessible platform—or "cloud-based service"—implemented as a computing infrastructure of processors, storage, software, data access, and so forth that is maintained and accessible via the network 108, such as the Internet. Cloud-based services may not require end-user knowledge of the physical location and configuration of the system that delivers the services. Common expressions associated with cloud-based services, such as the remote service 106, include "on-demand computing", "software as a service (SaaS)", "platform computing", "network accessible platform", and so forth.

The resources 114 may comprise one or more processors 116 and computer-readable media 118 executable on the processors 116. The computer-readable media 120 may store a map-generation module 120, a content-presentation module 122, a user-account datastore 124, and a content datastore 126. The map-generation module 120 may function to receive the sensor data 104 collected by the devices 102(1)-(8) within the environment and generate the corresponding map 110 of the environment 100. To do so, the map-generation module 120 may utilize the TDOA values, the wireless-signal strength data, the captured images of the environment, and other data (e.g., barometric-pressure data, ambient-light data, etc.) to create an estimate of a location of each device relative to one another. For instance, the module 120 may correlate TDOA values with a distance and orientation between devices. Similarly, the module 120 may correlate wireless-signal-strength between two devices to a distance between the two devices. For instance and as described above, a strong wireless-signal-strength between two devices typically indicates that the devices are closer to one another as compared to a weaker wireless-signal strength. Furthermore, the module 120 may utilize object-recognition techniques to identify the devices from images captured by the camera(s) and may estimate distances between the device housing the camera and the identified device(s) and/or between the devices identified in the images.

In some instances, the resulting generated map may comprise an indication of an estimated distance between each device and each other device, potentially along with an estimated orientation of each device relative to each other device. Additionally or alternatively, the map may comprises an estimated X, Y, and Z position of each device within the environment 100.

The content-presentation module 122, meanwhile, may function to send instructions to the devices 102(1)-(8) based in part upon the generated map 110. For instance, if a user requests to play a certain movie and if the environment includes multiple devices configured to present the movie, the content-presentation module 122 may select a device that is nearest a current location of the user within the environment for outputting the movie. In another example, as the user moves throughout the environment, the content-presentation module 122 may issue instructions to devices nearest the user to display certain content, such as the movie. As such, a user is able to move throughout the environment 100 while the content essentially follows the user to the device(s) nearest the user at any given time. In yet another example, the content-presentation module 122 may select content based in part upon the map 110 and the location of the user. For instance, if the user requests to play content from the content datastore 126 that could correspond to different pieces of content, the content-presentation module 122 may select the content based in part upon which device a user is nearest to. For instance, in the example above, if the user requests to "play The Cure" and the user is near the TV 102(6), then the content-presentation module 122 may output the movie "The Cure" on the TV 102(3). Otherwise, the content-presentation module 122 may output audio (e.g., on the device 102(5)) by the band "The Cure".

As illustrated, the user-account datastore 124 may store information associated with different user accounts, including information regarding which devices 128 are associated with a particular user account, as well as the generated position maps. That is, the user-account datastore 124 may maintain a user account for a user associated with the environment 102. The user 102 may register each device 102(1)-(8) with the remote service 106 such that the remote service 106 has accurate understanding of the devices within the environment of the user 102(1). In addition, the remote service may generate and store the map 110 of the devices within the user's environment for the reasons discussed above or otherwise.

Figure 2A:
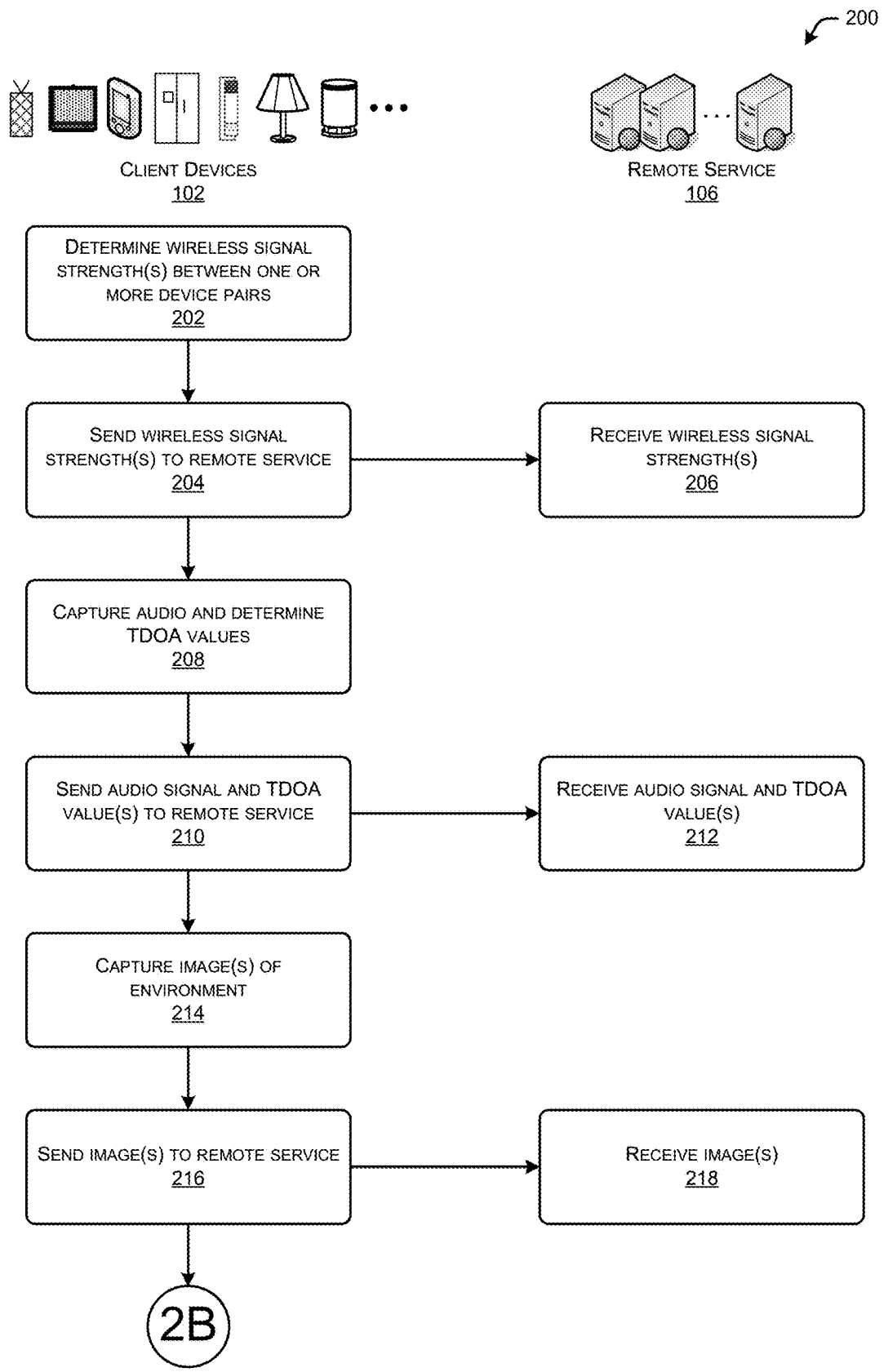
FIGS. 2A-B collectively depict a flow diagram of an illustrative process for the devices within the example environment of FIG. 1 sending data to the remote service and the remote service, in response, analyzing the data to determine relative positions of the devices within the environment.
Figure 2B:
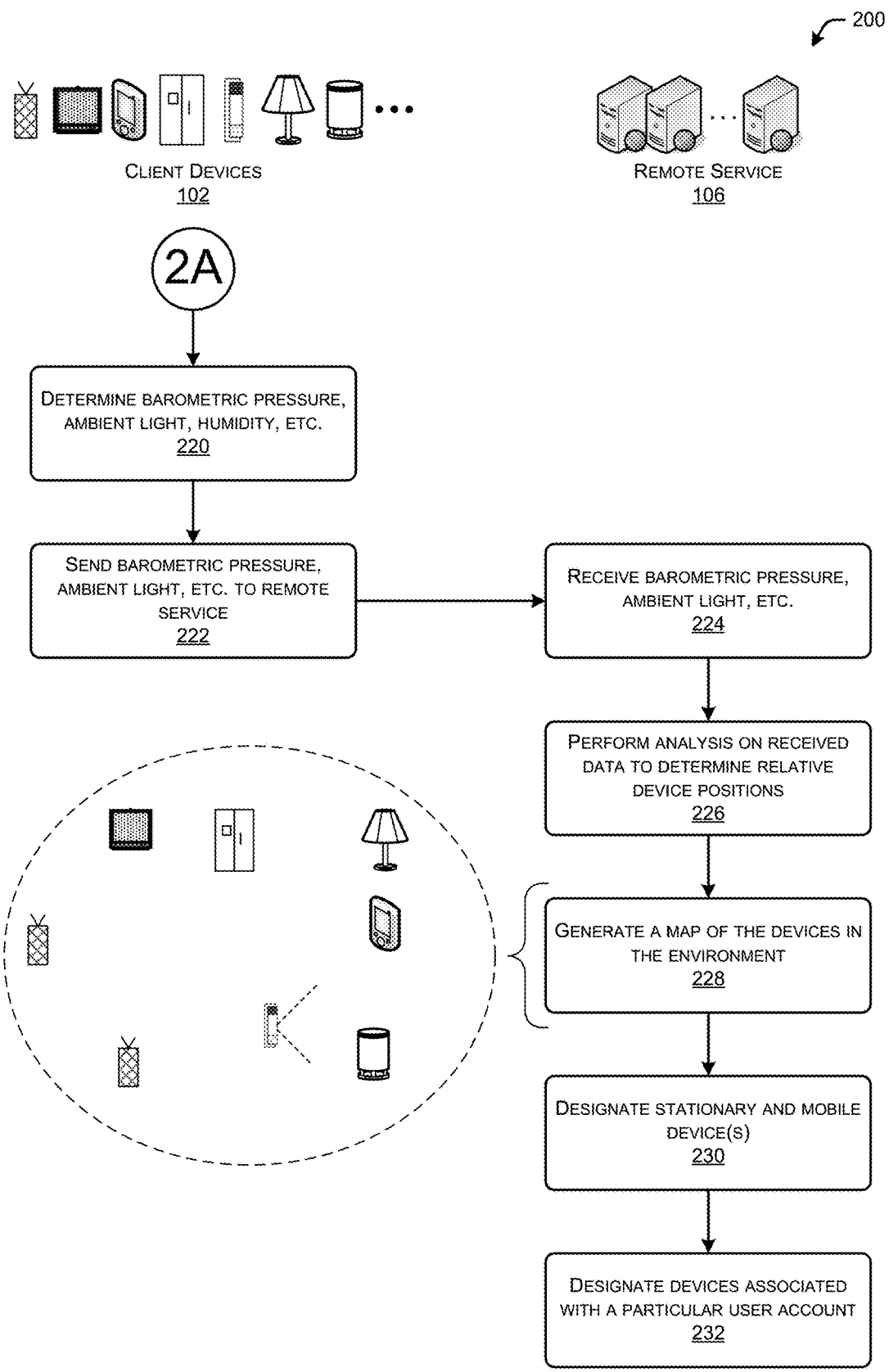

FIGS. 2A-B collectively depict a flow diagram of an illustrative process 200 for the devices 102 within the environment 100 sending data to the remote service 106 and the remote service 106, in response, analyzing the data to determine relative positions of the devices 102 within the environment 100. In some instances, the map-generation module 120 introduced above may perform some or all of the actions illustrated underneath the remote service 106. Further, this process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 202, a device within the environment may determine a wireless signal strength between itself and another device within the environment. This may be based on a WiFi connection strength, a Bluetooth® connection strength, or the like. In some instances, the operation 202 may include determining wireless signal strengths between multiple pairs of devices within the environment 100.

At 204, a device within the environment sends one or more indications of the wireless signal strengths to the remote service 106. At 206, the remote service receives and stores these indication(s). At 208, a device within the environment 100 may capture audio, generate a corresponding audio signal, and determine one or more TDOA values associated with the audio signal. That is, the device may store an indication of a difference in time between when a first microphone of the device received the audio and when a second microphone of the device received the audio. At 210, the device or another device sends the audio signal and the TDOA value(s) to the remote service 206, which receives this information at 212. In some instances, the remote service may use the audio signal to identify the audio and to map this audio to a particular device within the environment known to be outputting the audio.

At 214, a device within the environment 100 may capture one or more images of the environment. At 216, this device or another device may send these images to the remote service at 216, which receives the one or more images at 218.

FIG. 2B continues the illustration of the process 200. At 220, one or more devices within the environment collect one or more additional pieces of data, such as a barometric pressure surrounding a device, an amount of ambient light surrounding the device, an amount of humidity surrounding the device, movement of a device as measured by one or more inertial sensors (e.g., gyroscope, magnetometer, accelerometer, etc.), and/or the like. At 222, one or more devices within the environment 100 send this data to the remote service 106, which receives this data at 224.

At 226, the remote service (e.g., the map-generation component 120) may perform analysis on the array of received data to determine positions of the devices within the environment relative to one another. For instance, the remote service 106 may analyze the wireless-signal strength data, the TDOA values, the information from the images, and the additional data to generate an estimate of a distance between each device within the environment, potentially along with an orientation of each device relative to each other. At 228, the remote service 106 utilizes this estimated position data to generate a map, which may include all of the respective estimated distances and orientations of the devices relative to one another. Additionally or alternatively, the map may comprises an estimated X, Y, and Z position of each device within the environment.

At 230, the remote service 106 may also store indications of which devices within the environment are determined to be stationary and which are determined to be mobile. In some instances, the remote service may make this determination for each device based on a device type of each device, as well as with reference to whether or not the estimated position and/or orientation of a particular device within the environment changes over time. For instance, if a particular device remains in a particular location within the environment for a threshold amount of time, then the device may be designated as stationary. Conversely, if the device moves consistently within the environment, then the device may be designated as mobile. It is noted that these designations may change over time. For instance, a device that is stationary for a long period of time may at some point move within the environment and, hence, be re-designated from stationary to mobile. For instance, a laptop computer may reside at a desk for several weeks and, hence, may be designated as stationary. Thereafter, a user may move the laptop about the environment, at which point the laptop may be reclassified as mobile.

At 232, the remote service 106 may designate devices represented in the map as being associated with a particular user account. For instance, if the environment 100 is a home of a particular user, then the remote service 106 may determine which devices within the generated map of the environment correspond to the user account of the user, such that these devices are deemed available for presenting content associated with the user account the user. That is, the remote service 106 may determine which of the devices are identified within a list of devices associated with the account of the user at the remote service 106. In the example of FIG. 1, if the user has registered each of the devices 102(2)-(7) within his home as belonging to his user account, then the remote service may designate that the devices 102(2)-(7) within the map are associated with the account of the user and, hence, that the remote service 106 may use these devices to present content of the user account to the user. Conversely, in this example the remote service 106 may recognize that the WAP 102(1) is not associated with the account of the user, and hence, is not available for use with regards to account of the user. The remote service 106 may make this determination based on the WAP 102(1) not appearing on the list of devices associated with the account of the user, based on the WAP 102(1) appearing on a list associated with a different user account, or the like.

Figure 3:
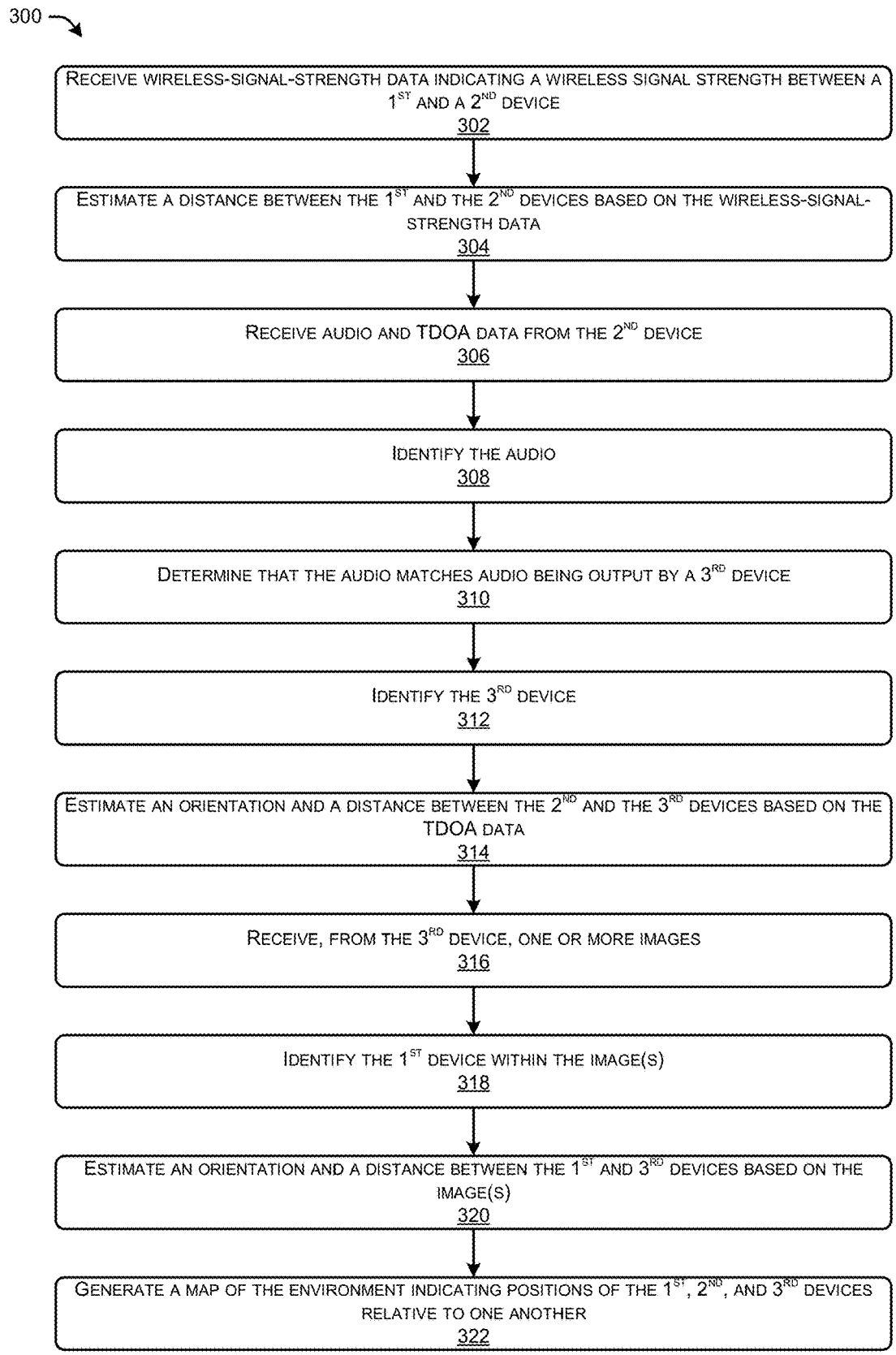
FIG. 3 is a flow diagram of an example process for determining a relative position of multiple devices based on data collected by those devices, including wireless-signal strength data, time-difference-of-arrival (TDOA) data, and image data.

FIG. 3 is a flow diagram of an example process 300 for determining a relative position of multiple devices based on data collected by those devices, including wireless-signal strength data, time-difference-of-arrival (TDOA) data, and image data. It is to be appreciated that the process 300 serves as an example scenario for position determination, and that the techniques described herein may estimate device positions using some or all of the data discussed in the process 300. Further, in some instances the map-generation component 120 may perform some or all of the process 300.

At 302, the process 300 may receive, from a first device within an environment, an identifier of the first device and wireless-signal-strength data indicating a wireless signal strength between the first device and a second device in the environment. At 304, the process 300 may estimate a distance and an orientation between the first and second devices based at least in part on the wireless-signal-strength data.

At 306, the process 300 may receive, from the second device, an identifier of the second device, an audio signal generated by the second device, and time-TDOA data indicative of a TDOA between audio received at a first microphone of the second device and at a second microphone of the second device. At 308, the process 300 may identify the audio by analyzing the audio signal and, at 310 the process 300 may determine that the audio matches audio output by a third device within the environment. At 312, the process 300 identifies the third device based on the determination made at 310. At 314, the process 300 may estimate a distance and an orientation between the second and third devices based at least in part on the TDOA data.

For instance, with reference to the example environment 100 above, the map-generation module 120 of the remote service 106 may analyze the difference in the time-of-arrival of the audio between the first microphone of the second device and the second microphone of the second microphone of the second device to determine the orientation between the second and third devices. If, for instance, the difference is relatively small, then the module 120 may determine that the first and the second microphones, and portions of the second device to which these microphones couple, are oriented to the third device in substantially the same manner as each other. That is, it may be determined that the first microphone and the second microphone are a substantially equal distance to the third device. If, however, the difference is quite large, then the module 120 may determine that the microphone that captured the audio first is oriented substantially closer to the third device than the other microphone.

Further, the volume of the audio may be used to determine a distance between the second and third devices. For instance, after identifying the third device that is outputting the audio, the module 120 may query or otherwise determine from the third device a volume level at which the third device is outputting the audio. The module 120 may then compare this volume level to the volume level captured by the microphone(s) of the second device and correlate the difference in the output volume to the captured volume to a distance between the second and third devices. For instance, if the output volume and the captured volume are substantially similar, then the module 120 may determine that the second and third devices are relatively close to one another. If, however, the disparity is quite large, then the module 120 may determine that the devices are relatively far from one another.

At 316, the process 300 receives, from the third device within the environment, an identifier of the third device and one or more images of the environment captured by a camera of the third device. At 318, the process 300 identifies the presence of the first device within at least one of the images, potentially using computer-vision techniques. For instance, using the example environment from above 100, the remote service 106 may store an indication of devices that are associated with different user accounts. For instance, the remote service 106 may store an indication of multiple devices (e.g., via their respective identifiers, device type, make, or model, or the like) that are associated with a user account of a user associated with the environment 100. Therefore, upon receiving images captured with the environment 100, the remote service 106 may utilize computer-vision techniques to identify one or more of the multiple devices associated with the user account from the images.

For instance, in the example of FIG. 1 above, the remote service may store an indication that devices 102(1)-(8) are associated with the respective user account. Upon receiving images captured by the camera of the TV 102(3), the map-generation module 120 of the remote service 106 may be configured to attempt to identify one or more of the devices 102(1), 102(2), and 102(4)-(8) from the images. To do so, the module 120 may reference the stored list of devices associated with the user account to identify each device type, make, model, or the like and, with this information, may determine visual information associated with each respective device. For instance, the module 120 may identify a make, model, and the like of the refrigerator 102(6) and may determine, from this information, a size, shape, color, and other visual characteristics of the refrigerator 102(6) within the environment. For example, the module 120 may determine (e.g., from the list of devices associated with the user account) that the refrigerator is model 123 from manufacturer "Acme Appliances". The module 120 may determine, from a website of Acme appliances, a user manual available online, or the like, the size, shape, color, and other visual characteristics of the 123-model refrigerator. After determining this information, the module 120 may attempt to identify an object within the captured images having visual characteristics that correspond to these visual characteristics. Upon identifying such an object with a threshold level of confidence, the module 120 may deem that it has identified an object corresponding to the device, such as the example refrigerator 102(6).

At 320, the process 300 estimates a distance and an orientation between the first and third devices based on the presence of the first device within the image(s) captured by the third device. For instance, continuing the example from above, the module 120 may utilize computer-vision techniques to identify visual characteristics of the device within the image(s), including color, shadows, contours, and the like. In addition, the module 120 may determine a size of the object within the image(s). Using these visual characteristics, the module 120 may determine a distance and orientation between the first and third devices. Finally, at 322, the process 300 generates a map of the environment indicating positions of the first, second, and third devices relative to each based at least in part on the estimations made at operations 304, 314, and 320.

Figure 4:
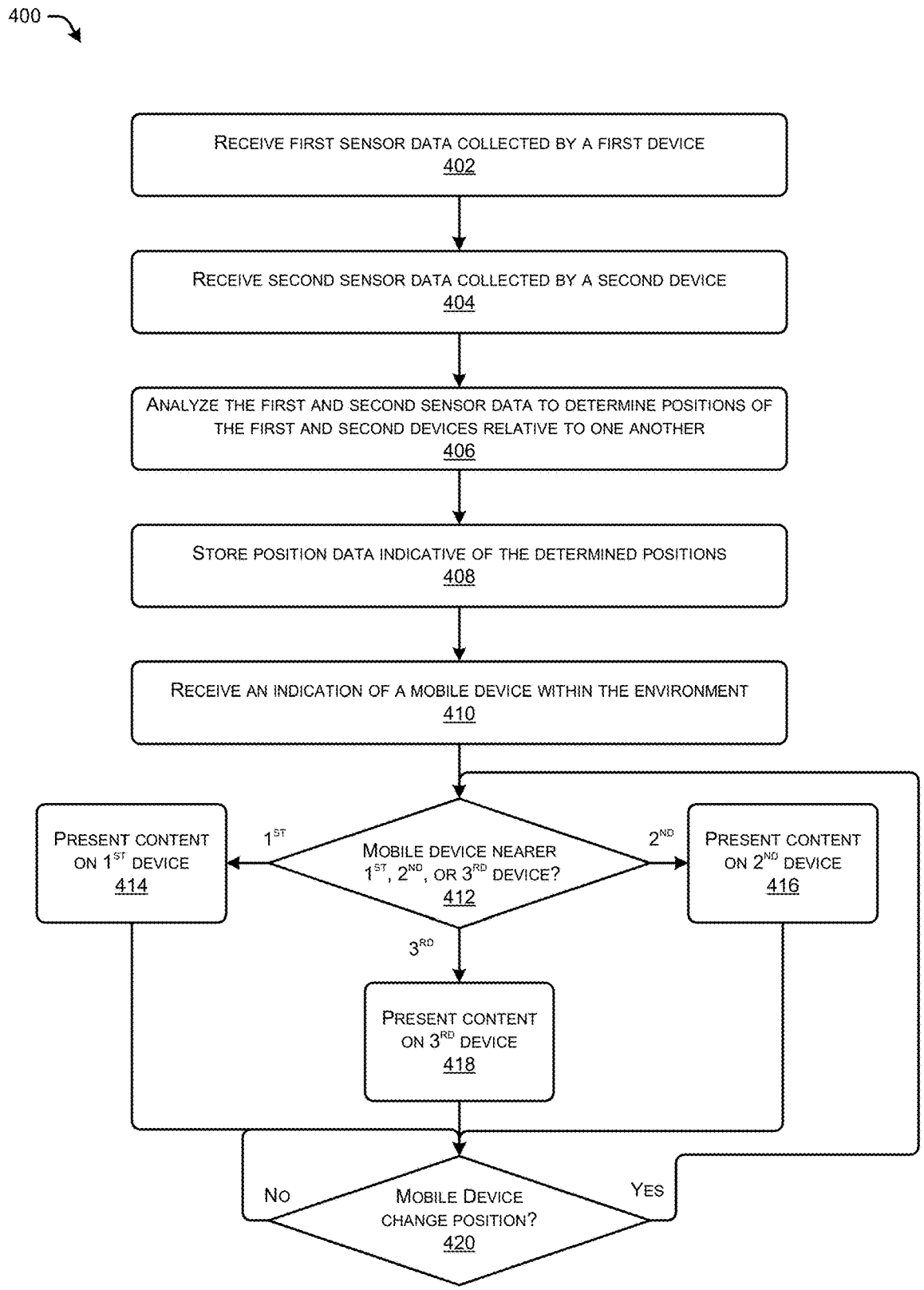
FIG. 4 is a flow diagram of an example process for determining a relative position of multiple devices in an environment and thereafter using this position data to determine which devices should present content as a user moves through the environment.

FIG. 4 is a flow diagram of an example process 400 for determining a relative position of multiple devices in an environment and thereafter using this position data to determine which devices should present content as a user moves through the environment. In some instances the map-generation component 120 and the content-presentation module 122 collectively perform some or all of the process 400.

At 402, the process 400 receives, from a first device in an environment, first sensor data collected by the first device, the first sensor data identifying at least a second device within the environment. This sensor data may comprise wireless-signal-strength data, TDOA data, image data, or the like. At 404, the process 400 receives, from the second device, second sensor data collected by the second device, the second sensor data identifying at least a third device within the environment. Again, this sensor data may comprise wireless-signal-strength data, TDOA data, image data, or the like. At 406, the process 400 analyzes the first sensor data and the second sensor to determine positions of the first, second, and third devices relative to one another and, at 408, the process 400 stores position data indicative of the determined positions of the first, second, and third devices relative to one another.

After storing this position data, at 410 the process 400 receives an indication that a mobile device associated with a user (e.g., a mobile phone registered to a user) is within the environment. At 412, the process determines whether the mobile device is nearer the first, second, or third device. If the mobile device is nearest the first device, then at 414 the process may present content (e.g., content requested by the user) on the first device. If the mobile device is nearest the second device, then at 416 the process 400 may present the content on the second device. If the mobile device is nearest the third device, then at 418 the process 400 may present the content on the third device.

Sometime after presenting the content on the first, second, or third device, the process 400 may determine whether the mobile device has changed position. If not, then the process 400 may continue to present the content until the mobile device does change position (or until the content is no longer presented, such as when the user requests to cease presenting the content). If, however, the mobile device has in fact changed positions, then the process 400 may return to the query 412 to determine which device within the environment the mobile device is nearest for the purpose of determine which device on which to present the content. With use of the process 400, the content-presentation module 122 is able to push the content to devices near the user, such that the content effectively follows the user through the environment.

Figure 5:
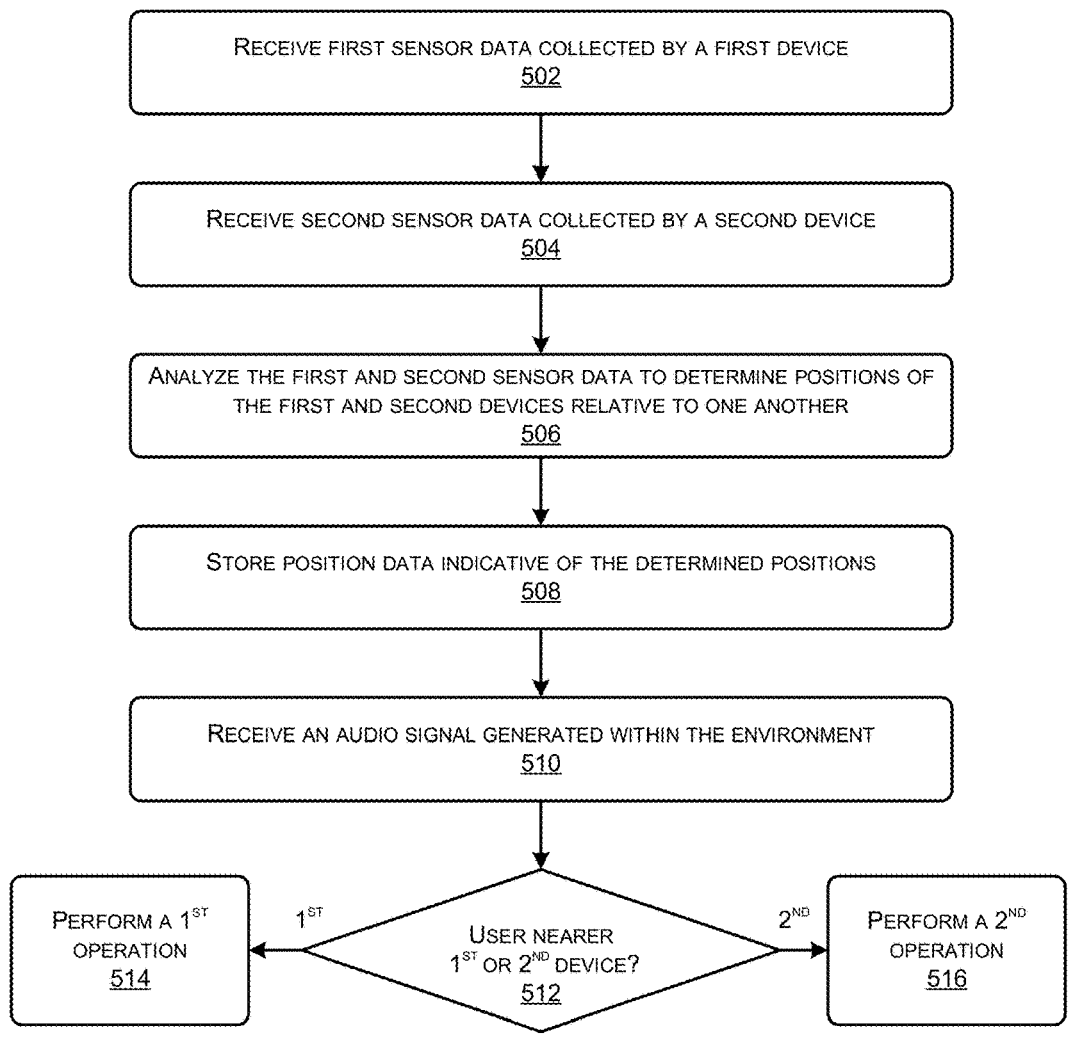
FIG. 5 is a flow diagram of an example process for determining a relative position of multiple devices in an environment and thereafter using this position data to determine an operation to perform in response a voice command of a user. As illustrated, this determination may be made at least in part on which device within an environment a user is nearest.

FIG. 5 is a flow diagram of an example process 500 for determining a relative position of multiple devices in an environment and thereafter using this position data to determine an operation to perform in response a voice command of a user. As illustrated, this determination may be made at least in part on which device within an environment a user is nearer to. Again, in some instances the map-generation component 120 and the content-presentation module 122 collectively perform some or all of the process 400.

At 502, the process 500 receives, from a first device in an environment, first sensor data collected by the first device, the first sensor data identifying at least a second device within the environment. This sensor data may comprise wireless-signal-strength data, TDOA data, image data, or the like. At 504, the process 500 receives, from the second device, second sensor data collected by the second device, the second sensor data identifying at least a third device within the environment. Again, this sensor data may comprise wireless-signal-strength data, TDOA data, image data, or the like. At 506, the process 500 analyzes the first sensor data and the second sensor to determine positions of the first, second, and third devices relative to one another and, at 508, the process 500 stores position data indicative of the determined positions of the first, second, and third devices relative to one another.

After storing this position data, at 510 the process 500 receives an audio signal generated within the environment. In some instances, this audio signal includes a voice command requesting that the remote service perform some sort of operation. At 512, the process 500 determines whether the user is nearer a first device or a second device within the environment. For instance, the process 500 may determine whether the device that initially provided the audio signal is nearer to the first device or the second device and may use this as a proxy for a location of the user. In another example, the process 500 may compare a location of a mobile phone of the user to a position of the first device and a position of the second device to determine which device the user is nearer to.

In response to determining that the user is nearer the first device, the process 500 may perform a first operation at 514. In response to determining that the user is nearer the second device, meanwhile, the process 500 may perform a second operation at 516. For instance, if a user issues a command to "play The Cure" and the user is nearer a television, then the process 500 may determine to present the movie "The Cure"

on the television. If, however, the user is nearer an audio system, then the process 500 may determine to play audio on the audio system corresponding to music played by the band "The Cure".

Figure 6:
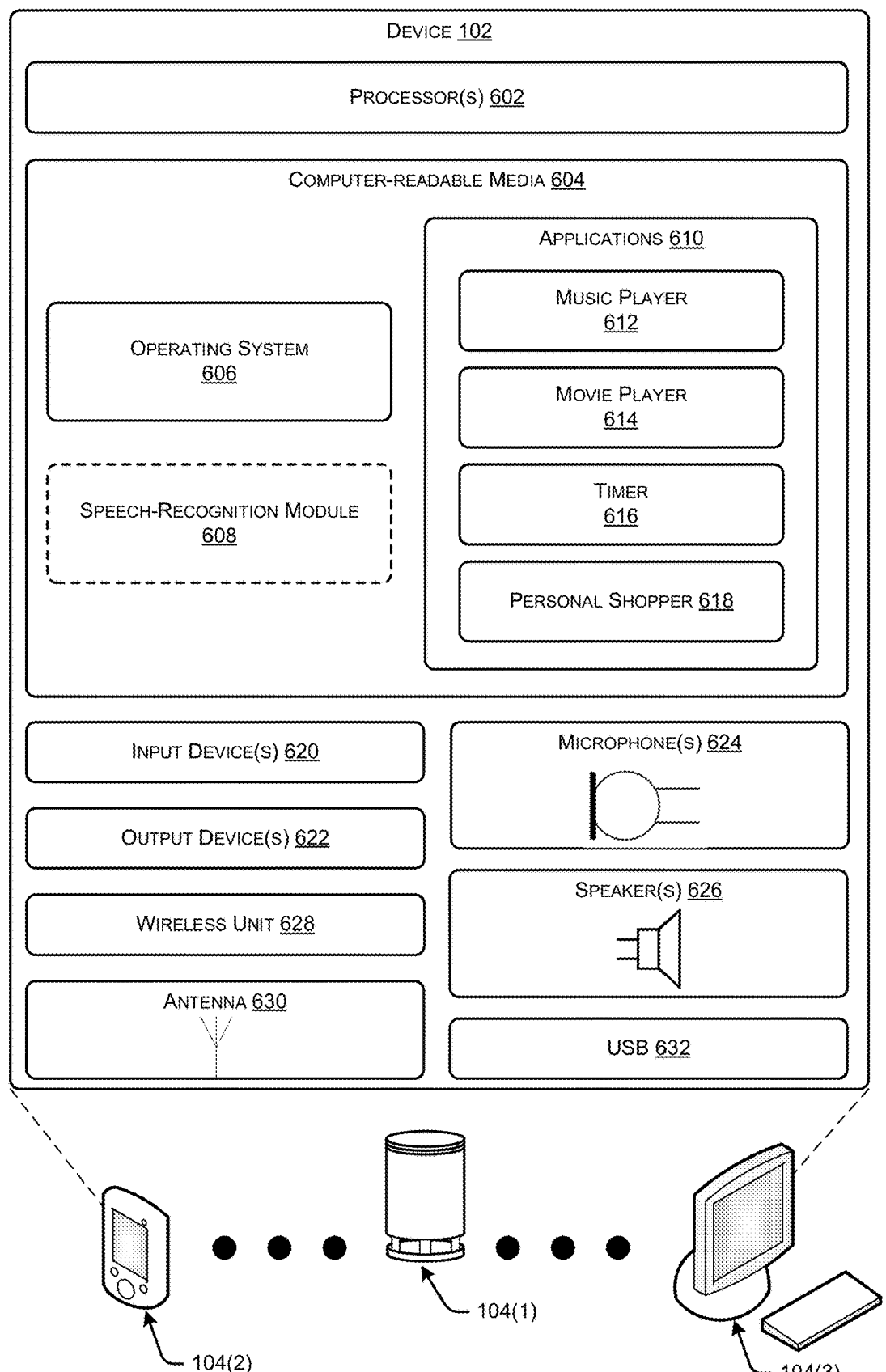
FIG. 6 shows a functional block diagram of selected components implemented at a user device, such as one of the user devices of FIG. 1.

FIG. 6 shows a functional block diagram of selected components implemented at a user device, such as one of the user devices 102(1)-(8) of FIG. 1. It is to be appreciated that the illustrated components are merely illustrative, and that individual ones of the devices 102(1)-(8) may include more or fewer components than what FIG. 6 illustrates. Further, the devices 104(1), 104(2), and 104(3) are merely examples and not intended to be limiting.

In the illustrated implementation, the example device 104 includes one or more processors 602 and computer-readable media 604. In some implementations, the processors(s) 602 (as well as all processors described herein) may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 602 may possess its own local memory, which also may store program modules, program data, and/or one or more operating systems.

The computer-readable media 604 (as well as all computer-readable media described herein) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 604 may be implemented as computer-readable storage media ("CRSM"), which may be any available physical media accessible by the processor(s) 602 to execute instructions stored on the memory 604. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 602.

Several modules such as instruction, datastores, and so forth may be stored within the computer-readable media 604 and configured to execute on the processor(s) 602. A few example functional modules are shown as applications stored in the computer-readable media 604 and executed on the processor(s) 602, although the same functionality may alternatively be implemented in hardware, firmware, or as a system on a chip (SOC).

An operating system module 606 may be configured to manage hardware and services within and coupled to the device 104 for the benefit of other modules. The device 104 may further include, in some instances, a speech-recognition module 608 that employs any number of conventional speech processing techniques such as use of speech recognition, natural language understanding, and extensive lexicons to interpret voice input. In some instances, the speech-recognition module 608 may simply be programmed to identify the user uttering a predefined word or phrase (i.e., a "wake word"), after which the device 104 may begin uploading audio signals to the remote service 106 for more robust speech-recognition processing. In other examples, the device 104 itself may, for example, identify voice commands from users and may provide indications of these commands to the remote service 106.

The device 104 may also include a plurality of applications 610 stored in the computer-readable media 604 or otherwise accessible to the device 104. In this implementation, the applications 610 are a music player 612, a movie player 614, a timer 616, and a personal shopper 618. However, the device 104 may include any number or type of applications and is not limited to the specific examples shown here. The music player 612 may be configured to play songs or other audio files. The movie player 614 may be configured to play movies or other audio visual media. The timer 616 may be configured to provide the functions of a simple timing device and clock. The personal shopper 618 may be configured to assist a user in purchasing items from web-based merchants.

Generally, the device 104 has input devices 620 and output devices 622. The input devices 620 may include a keyboard, keypad, mouse, touch screen, joystick, control buttons, etc. In some implementations, one or more microphones 624 may function as input devices 620 to receive audio input, such as user voice input. The output devices 622 may include a display, a light element (e.g., LED), a vibrator to create haptic sensations, or the like. In some implementations, one or more speakers 626 may function as output devices 622 to output audio sounds.

In instances where the device 104 comprises a voice-controlled device, a user 102 may interact with the device 104 by speaking to it, and the one or more microphone(s) 624 capture the user's speech. The device 104 can communicate back to the user by emitting audible statements through the speaker 626. In this manner, the user 102 can interact with the device 104 solely through speech, without use of a keyboard or display.

The device 104 may further include a wireless unit 628 coupled to an antenna 630 to facilitate a wireless connection to a network. The wireless unit 630 may implement one or more of various wireless technologies, such as Wi-Fi, Bluetooth®, Zigbee®, RF, and so on. A USB port 632 may further be provided as part of the device 104 to facilitate a wired connection to a network, or a plug-in network device that communicates with other wireless networks. In addition to the USB port 632, or as an alternative thereto, other forms of wired connections may be employed, such as a broadband connection.

Accordingly, when implemented as the primarily-voice-operated device 104(1), there may be no input devices, such as navigation buttons, keypads, joysticks, keyboards, touch screens, and the like other than the microphone(s) 624. Further, there may be no output such as a display for text or graphical output. The speaker(s) 626 may be the main output device. In one implementation, the device 104(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 104(1) may be implemented as an aesthetically appealing device with smooth and rounded surfaces, with one or more apertures for passage of sound waves. The device 104(1) may merely have a power cord and optionally a wired interface (e.g., broadband, USB, etc.). As a result, the device 104(1) may be generally produced at a low cost. Once plugged in, the device may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors; and
   one or more computer-readable media storing computer-executable instructions that, when executed on the one or more processors, cause the one or more processors to perform acts comprising:
   receiving, from a first device located at a first position within an environment that is remote from the system, first data that identifies a second device located at a second position within the environment;
   receiving second data that identifies a third device located at a third position within the environment;
   generating environment data based at least in part on the first data and the second data, the environment data indicating the second position and the third position within the environment relative to one another;
   storing the environment data;
   determining a target device based at least in part on a distance to a user within the environment;
   identifying an operation to perform based, at least in part, on the target device; and
   causing the target device to perform the operation.

2. The system as recited in claim 1, wherein receiving the first data and receiving the second data comprises receiving two or more of audio data, image data, wireless signal-strength data that indicates one or more characteristics associated with one or more wireless signals within the environment, and light data.

3. The system as recited in claim 1, wherein receiving the one or more of the first data and the second data comprises receiving one or more audio signals; and the acts further comprising analyzing the one or more audio signals to identify one or more of the second device and the third device based at least in part on determining that at least a portion of the one or more audio signals matches audio output by one or more of the second device and the third device within the environment.

4. The system as recited in claim 1, the acts further comprising:
   determining a location associated with a user within the environment;
   determining that the first device is nearer to the location than the second device and the third device; and
   causing the first device to present content.

5. The system as recited in claim 4, the acts further comprising:
   determining an updated location associated with the user within the environment;
   determining that the second device is nearer to the updated location than the first device and the third device; and
   causing the second device to present content.

6. The system as recited in claim 1, wherein identifying the operation to perform comprises identifying a first operation in response to determining that the target device is the first device, identifying a second operation in response to determining that the target device is the second device, and identifying a third operation in response to determining that the target device is the third device.

7. The system as recited in claim 1, wherein generating the environment comprises generating a map of the environment and transmitting at least a portion of the map to one or more devices within the environment.

8. A method comprising:
   receiving, from a first device located at a first position within an environment that is remote from a system, first data that identifies a second device located at a second position within the environment;
   receiving second data that identifies a third device located at a third position within the environment;
   generating environment data based at least in part on the first data and the second data, the environment data indicating the second position, and the third position within the environment relative to one another;
   storing the environment data;
   determining a target device based at least in part on a distance to a user within the environment;
   identifying an operation to perform based, at least in part, on the target device; and
   causing the target device to perform the operation.

9. The method as recited in claim 8, wherein receiving the first data and receiving the second data comprises receiving two or more of audio data, image data, wireless signal-strength data that indicates one or more characteristics associated with one or more wireless signals within the environment, and light data.

10. The method as recited in claim 8, wherein receiving the one or more of the first data and the second data comprises receiving one or more audio signals; and further comprising analyzing the one or more audio signals to identify the third device based at least in part on determining that at least a portion of the one or more audio signals matches audio output by the third device within the environment.

11. The method as recited in claim 8, further comprising:
    determining a current location associated with a user within the environment;
    determining that the first device is nearer to the current location than the second device and the third device; and
    causing the first device to present content.

12. The method as recited in claim 8, wherein identifying the operation to perform comprises identifying a first operation in response to determining that the target device is the first device, identifying a second operation in response to determining that the target device is the second device, and identifying a third operation in response to determining that the target device is the third device.

13. The method as recited in claim 8, wherein the receiving the first data comprises receiving data that indicates a wireless signal strength between the first device and the second device.

14. The method as recited in claim 8, wherein the receiving the first data comprises receiving one or more images captured by a camera within the environment, the one or more images including at least one image that includes the second device.

15. The method as recited in claim 8, wherein the receiving the first data comprises receiving time-difference-of-arrival (TDOA) data indicative of a TDOA between audio received at a first microphone of the first device and a second microphone of the first device, the audio having been output by the second device.

16. The method as recited in claim 8, wherein the receiving the first data comprises receiving data indicative of audio output by the second device, and further comprising:
identifying the audio;
determining that the audio matches audio being output in the environment by the second device; and
identifying the second device.

17. The method as recited in claim 8, further comprising:
determining, from at least one of the first data or the second data, that the first device is moving within the environment;
storing an indication that the first device is mobile;
determining, from at least one of the first data or the second data, that the second device is not moving within the environment; and
storing an indication that the second device is stationary.

18. The method as recited in claim 8, further comprising:
receiving, from the first device, an indication that a mobile device associated with a user account is proximate to the first device; and
sending an instruction to at least one of the first, second, or third devices to present content.

* * * * *